Patented Sept. 7, 1926.

1,599,226

UNITED STATES PATENT OFFICE.

FREDERICK W. FREISE, OF PALMYRA, NEW JERSEY, ASSIGNOR TO AMERICAN CYANAMID COMPANY, OF NEW YORK, N. Y., A CORPORATION OF MAINE.

FERTILIZER CORRECTIVE.

No Drawing. Application filed July 23, 1923. Serial No. 653,381.

This invention relates to a method of improving the physical condition of a fertilizer material. The nature of the constituents and the percentages of available plant food are undoubtedly the important factors from a fertilizer standpoint, but the product must have a proper physical condition to be of commercial value.

To be salable and in a condition for shipment, storage and application to the soil it must be dry, loose and granular. If wet it almost invariably cakes, gives trouble in handling and clogs the machinery.

The object of this invention is to improve the factory practice by shortening the curing period. This eliminates a great deal of the requirements in reference to storage space. As an additional object of my invention I endeavor to reduce the chances of imperfect batches, which cause undue delay and loss of material. With these and other objects in view the invention consists in the novel steps and combination of steps constituting the process, and in the novel product, all as will be more fully hereinafter described and particularly pointed out in the claims.

To more clearly define and point out the nature of the invention, the following are given as illustrations.

A. To 1200 parts by weight of 52° Bé. sulphuric acid were added 1000 parts by weight of finely ground phosphate rock, and as soon as this had reacted, 100 parts by weight of calcium cyanamid were stirred in, and the whole discharged into a den. After the preliminary setting and the formation of the honey-comb mass, which is usual in treatments of this nature in commercial fertilizer plants, and the hot mass was removed from the den, the sulphate of ammonia at the rate of 100 pounds per ton was incorporated, and the whole was piled in the usual heaps.

On comparing the resulting material on cooling with a sample to which no sulphate of ammonia had been added a decided improvement was apparent. The analysis also disclosed an advantage in the addition of conditioning material, i. e. the sulphate of ammonia. Before treating the $P_2O_5$ was 89.8% available; and after treating it was 92.4% available. In addition the treated product was dry, granular and of excellent texture.

B. To 950 parts by weight of 52° Bé. sulphuric acid were added 200 parts by weight of nitrogenous material such as leather scrap, wool waste, feathers, garbage, hair, etc., and after this had reacted 1000 parts by weight of finely ground phosphate rock was added, and as soon as this had all been attacked it was discharged into the den to set, as is the usual custom in commercial fertilizer practice. On breaking up and removing the hot porous mass in the den, 100 pounds of sulphate of ammonia was added to each ton of material, and the mass deposited in heaps to cool and cure. As a result of the addition of the corrective agent, i. e. the sulphate of ammonia, the product was dry, granular and of excellent condition. Also as in the previous illustration, its fertilizing value was increased. Before the addition of sulphate of ammonia the available $P_2O_5$ was 85.8%; and after, it rose to 89.5%.

I have thus discovered a method of conditioning fertilizer batches of various kinds, and have observed that ammonium sulphate under certain conditions is a curing agent capable of wide application. This curing is accomplished by mixing ammonium sulphate with fertilizer materials that have passed through the manufacturing stage but have not been cured. It is well known that a wet, soggy material has little or no commercial value, as it cannot be shipped in bags or distributed in the fields. If, as is usually the case, the adhering liquid is acid mechanical difficulties will arise.

Considering the importance of always obtaining a dry granular mass, the value of a material that may be added at the end of the operation and will bring about this result, cannot be overestimated. The actual cause of the action is but imperfectly understood. In the past it has been found that on adding ammonium sulphate according to the "dry mix" methods the batch first became moist and then sets to a rock-like mass.

The peculiar and anomalous results that are obtained in this discovery are partially due at least to a fundamentally different method of treatment. Instead of adding the sulphate of ammonia in the early stages of manufacture, I usually add it to the hot honey-comb mass as it is broken up in the den and piled to cure.

To further explain the procedure I may say that in actual fertilizer practice as carried out on a commercial scale, the untreated phosphate rock, in a finely ground condition, is stirred into the concentrated acid in the mixer, and the hot liquid sludge is discharged into the den and allowed to undergo a preliminary setting. As soon as it partially hardens and forms a honey-comb mass due to the slow evolution of such gases as sulphur dioxide, carbon dioxide, etc., it is broken up and repiled to cure. It is at this stage that I find it most advantageous to add my conditioning agent. Although I have referred in the above, to the treatment of phosphate rock alone, I do not wish to be understood as being in any way limited in this respect, as I may employ various materials, such as those used in making ammoniated bases, etc.

Another feature, and one that would scarcely be expected, is that when sulphate of ammonia is used as a corrective agent, the tendency of the mass to cake is materially reduced. This is remarkable as ammonium sulphate alone, even in an almost anhydrous condition, cakes very badly, due probably to the presence of traces of pyridine.

One of the many advantages consequent upon the conditioning of the fertilizer with sulphate of ammonia, is the increase in availability of the $P_2O_5$ and the shortening of the curing period that is thus made possible. In addition the expense of adding the small percentage of sulphate of ammonia at the end of the operation, and during the piling, is extremely small. Its addition does not necessitate any handling or turning of the material that would not take place in the ordinary operation.

It is obvious that those skilled in the art may vary the details of the process and the nature of the product without departing from the spirit of the invention. Therefore I do not wish to be limited to the above disclosures except as may be required by the claims.

I claim:—

1. A method of improving the physical condition of a fertilizer material which comprises adding ammonium sulphate to the mass as it comes from the den, and allowing the whole to cure to render the mass dry and granular; substantially as described.

2. A method of improving the physical condition of a fertilizer material which comprises adding ammonium sulphate to the hot steaming honey-comb mass as removed from the den and allowing the whole to cure in heaps; substantially as described.

3. A method of improving the physical condition of a fertilizer material normally damp, soggy and acid, which comprises adding ammonium sulphate to the material in a hot condition and allowing it to cool in heaps; substantially as described.

4. A method of improving the physical condition of a fertilizer material which comprises adding sufficient sulphate of ammonia to the normally damp and soggy manufactured product to insure the formation of a dry, granular, non-caking mass; substantially as described.

5. A method of improving the physical condition of a fertilizer material which comprises treating phosphate rock and calcium cyanamid in a mixing pan with sulphuric acid, allowing the sludge to partially set to a honey-comb mass in a den, and incorporating ammonium sulphate with the hot mass as discharged from the den; substantially as described.

6. A method of improving the physical condition of a fertilizer material which comprises treating 1000 parts by weight of finely ground phosphate rock and about 100 parts by weight of calcium cyanamid with about 1200 parts by weight of 52° Bé. sulphuric acid, allowing the mass to partially set to a honey-comb, and mixing about 5% ammonium sulphate with the hot mass, and allowing to cure in heaps; substantially as described.

7. A new fertilizer material comprising a dry, granular non-caking mass being composed of various plant food constituents of such character as to normally form a wet, soggy material but rendered dry and granular by means of sulphate of ammonia; substantially as described.

8. A new fertilizer material comprising phosphate rock and calcium cyanamid chemically changed through the action of sulphuric acid, and whose physical condition is rendered dry and granular with sulphate of ammonia; substantially as described.

In testimony whereof I affix my signature.

FREDERICK W. FREISE.